(12) United States Patent
Linnenbrink

(10) Patent No.: US 8,046,887 B2
(45) Date of Patent: Nov. 1, 2011

(54) METHOD OF OPERATING A GEARWHEEL MACHINING TOOL

(76) Inventor: Wolfgang Linnenbrink, Warburg (DE)

( * ) Notice: Subject to any disclaimer, the term of this patent is extended or adjusted under 35 U.S.C. 154(b) by 885 days.

(21) Appl. No.: 12/053,083

(22) Filed: Mar. 21, 2008

(65) Prior Publication Data

US 2009/0035086 A1 Feb. 5, 2009

(30) Foreign Application Priority Data

Aug. 3, 2007 (EP) .................................. 07015321

(51) Int. Cl.
*B24B 39/00* (2006.01)

(52) U.S. Cl. ............... 29/90.6; 29/893; 29/557; 29/90 B; 72/107; 51/26

(58) Field of Classification Search .................... 29/893, 29/893.1, 557, 559, 90 B, 90 R, 90.6; 51/26; 72/107

See application file for complete search history.

(56) References Cited

U.S. PATENT DOCUMENTS

| 2,423,593 | A | * | 7/1947 | Gasser | 451/47 |
| 2,679,089 | A | * | 5/1954 | Opitz et al. | 72/126 |
| 4,305,190 | A | | 12/1981 | Flair | |
| 4,550,508 | A | * | 11/1985 | Spaeth | 33/501.19 |
| 4,635,404 | A | * | 1/1987 | Wirz | 451/250 |
| 4,690,009 | A | * | 9/1987 | Rakhit | 74/409 |
| 5,271,271 | A | * | 12/1993 | Frazier | 73/162 |
| 5,513,442 | A | * | 5/1996 | Flair | 33/501.19 |
| 7,402,006 | B2 | * | 7/2008 | Yoshikawa | 409/2 |
| 7,712,219 | B2 | * | 5/2010 | Wirz | 29/893.31 |

FOREIGN PATENT DOCUMENTS

DE 3119853 C2 2/1982

\* cited by examiner

*Primary Examiner* — Derris Banks
*Assistant Examiner* — Azm Parvez
(74) *Attorney, Agent, or Firm* — Laurence A. Greenberg; Werner H. Stemer; Ralph E. Locher

(57) ABSTRACT

In a method of operating a gearwheel machining tool having a machining wheel situated on a drive axis, for reworking a gearwheel, a fixed axial distance between both wheels is set. In this manner, the engagement of the gearwheel in the teeth of the machining wheel may be performed without damage in a technically simple way, which is achieved in that the gearwheel to be machined is placed on the arbor in an arbitrary rotational angle position, tooth areas of its lateral external faces facing toward the machining wheel coming to rest on lateral tooth areas of the machining wheel, upon which the machining wheel is set into rotation and the gearwheel to be machined slides axially on the arbor into its machining position. After which the tooth gaps of the two overlapping areas of the wheels are rotated one over the other and the wheels are mutually engaged.

9 Claims, 2 Drawing Sheets

METHOD OF OPERATING A GEARWHEEL MACHINING TOOL

CROSS-REFERENCE TO RELATED APPLICATION

This application claims the priority, under 35 U.S.C. §119, of European application EP07015321.8, filed Aug. 3, 2007; the prior application is herewith incorporated by reference in its entirety.

BACKGROUND OF THE INVENTION

Field of the Invention

The invention relates to a method of operating a gearwheel machining tool, in particular of external, but also internal spur gears or spiral gears, having a machining wheel, which is situated on a drive axis and is preferably diamond coated, and a gearwheel to be machined. A fixed axial distance of both wheels is set, at least during engagement and/or disengagement of a gearwheel to be machined on or by an arbor, which is less than the sum of the two tip circle radii and is greater than the sum of one tip circle radius and one root circle radius of the other wheel.

A device for smoothing tooth flanks of gearwheels by rolling is known from German patent DE 31 19 853 C2 (corresponding to U.S. Pat. No. 4,305,190), in which a machining wheel is radially advanced toward a gearwheel to be machined. This device has the disadvantage that before the mutual engagement of the teeth, in some cases the tooth heads may strike against one another, which may result in the very brittle diamond coating chipping off over a large area of the tooth flanks of the machining wheel, so that it may no longer be used further.

BRIEF SUMMARY OF THE INVENTION

It is accordingly an object of the invention to provide a method of operating a gearwheel machining tool that overcomes the above-mentioned disadvantages of the prior art methods of this general type, in which the engagement and disengagement of a gearwheel to be machined into and out of the teeth of a machining wheel may occur without damage in a technically simple way.

With the foregoing and other objects in view there is provided, in accordance with the invention, a method of operating a gearwheel machining tool having a machining wheel disposed on a drive axis. The method includes placing a gearwheel to be machined at a fixed axial distance from the machining wheel, at least during engagement and/or disengagement of the gearwheel to be machined onto or from an arbor. The fixed axial distance is less than a sum of two tip circle radii and is greater than a sum of one tip circle radius of one of the machining wheel and the gearwheel and one root circle radius of the other of the machining wheel and the gearwheel. The gearwheel to be machined is placed at an arbitrary rotational angle position on the arbor. Tooth areas of the gearwheel lateral external surface facing toward the machining wheel coming to rest on lateral tooth areas of the machining wheel, upon which the machining wheel being set into rotation or already rotates and the gearwheel to be machined slides axially on the arbor into a machining position, after which tooth gaps of two overlapping areas of the gearwheel and the machining wheel are rotated one over the other and the gearwheel and the machining wheel mutually come into engagement, upon which the gearwheel to be machined is fixed on the arbor and actual machining begins.

Because the gearwheel to be machined is placed in an arbitrary rotational angle position on the arbor, tooth areas of its lateral external surface facing toward the machining wheel coming to rest on lateral tooth areas of the machining wheel, by setting the machining wheel into rotation, which may also be previously set into a slight rotation, however, the gearwheel to be machined may be brought axially up into its machining position on the arbor, after the tooth gaps of the two overlapping areas of the gearwheel have been rotated over one another and the gears mutually come into engagement, upon which the gearwheel to be machined is chucked in its machining position on the arbor and the actual machining step may begin.

This advantageous operating method allows the wheels to be brought into engagement collision-free without radial advancement movements of one of the wheels, by which a head-on collision of the tooth heads may be completely avoided.

Furthermore, technically complex pre-positioning of the teeth is not necessary, so that a highly efficient operating method, which is simple, robust, and nonetheless gentle to tools, of a gearwheel machining tool, and/or a first partial operating method of engaging a gearwheel to be machined may be provided.

According to a first preferred embodiment of a gearwheel machining tool having rotational axes oriented in vertical directions, such as the drive axis of the machining wheel and the driven axis of the arbor for receiving the gearwheel to be machined, only the intrinsic weight of the gearwheel to be machined is used for engagement. However, it is also conceivable to additionally hold the gearwheel to be machined and to further accelerate the feed movement after beginning engagement of the opposing wheels or to limit the natural falling acceleration to make the operating method even more secure and completely avoid chipping of the abrasive corundum.

In a second embodiment of the gearwheel machining tool having axes of the drive axis of the machining wheel and the arbor of the gearwheel to be machined situated in horizontal directions, these axes have to be brought into their machining position by an additional actuating device, of course, the wheel to be machined first lightly moving up to the machining wheel here and, after the mutual teeth have begun to engage, an arbitrary force-supported axial mounting movement of the gearwheel to be machined up into its machining position being able to be generated.

According to an advantageous operating step of the present operating method which precedes the engagement, the gearwheel to be machined is simply placed manually on the arbor and may thus also be removed from the arbor after the completed machining. However, an operating method in which the gearwheel to be machined is automatically placed on the arbor and is thus also removed therefrom, so that the degree of automation of the operating method of this gearwheel machining tool may be increased arbitrarily, is also conceivable.

Furthermore, it is advantageous that an expanding arbor is used as the arbor for receiving the gearwheel to be machined, which first radially centers and fixes the gearwheel to be machined by enlarging its circumference after reaching the machining position, so that no further operating steps are necessary for axial fixing of the gearwheel to be machined.

The operating method according to the present invention may be performed not only on external spur gears or spiral gears, but rather also on internal spur gears, which may then be placed on the arbor of the gearwheel machining tool using a bell according to the present invention.

Furthermore, the operating method may also be performed using all linear, helical, or spiral spur gears that allow mechanical engagement.

According to a further advantageous operating step of the operating method, the disengagement of a helical or spiral completely machined gearwheel is also performed according to the present invention in that after the unclamping of the expanding arbor, the machining wheel is moved backward, the completely machined gearwheel being held by hand or by a gripper using a support torque, it being moved axially out of its machining position away from the arbor by the rotation of the machining wheel.

The operating step of the machining is performed as usual either with a fixed axial distance using a single-flank contact, the free rotation of the gearwheel to be machined being braked by a support torque in the expanding arbor. The machining may also, however, occur via a double-flank contact, in which the axial distance is varied. The suspension of the machining wheel and/or the wheel to be machined of the gearwheel machining tool may be implemented arbitrarily as rigid or oscillating, and an oscillation of one of the two wheels is also conceivable.

Other features which are considered as characteristic for the invention are set forth in the appended claims.

Although the invention is illustrated and described herein as embodied in a method of operating a gearwheel machining tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
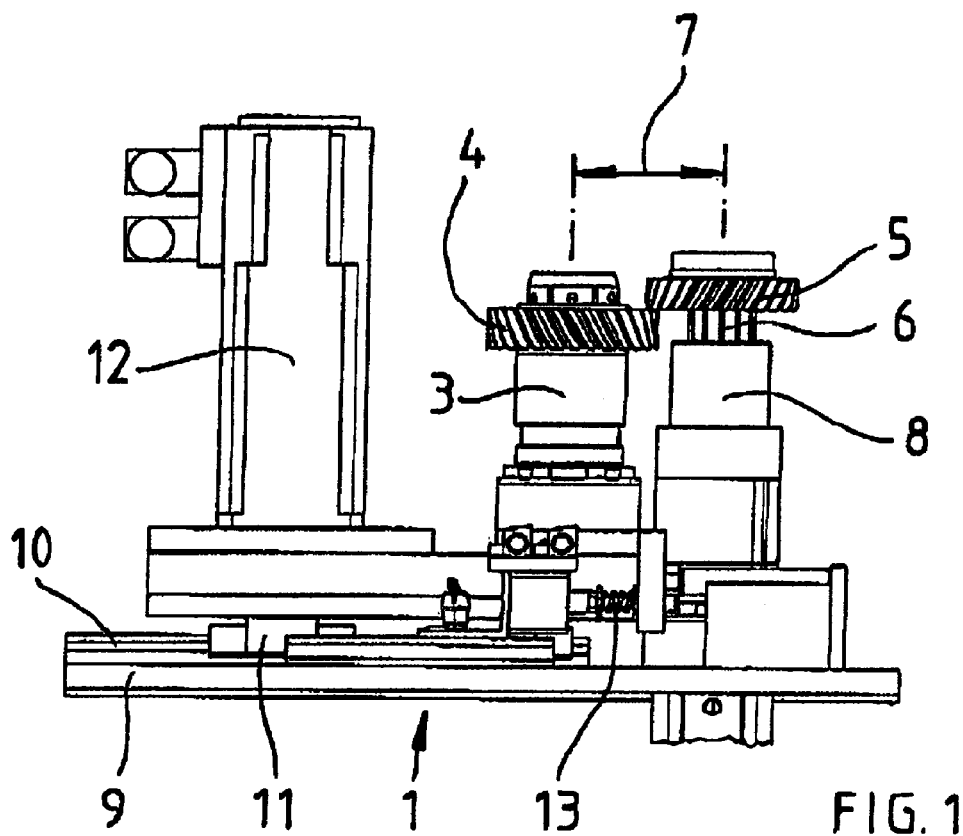
FIG. 1 is a diagrammatic, side-view of a gearwheel machining tool having a gearwheel to be machined, placed on a machining wheel according to the invention.
Figure 2:
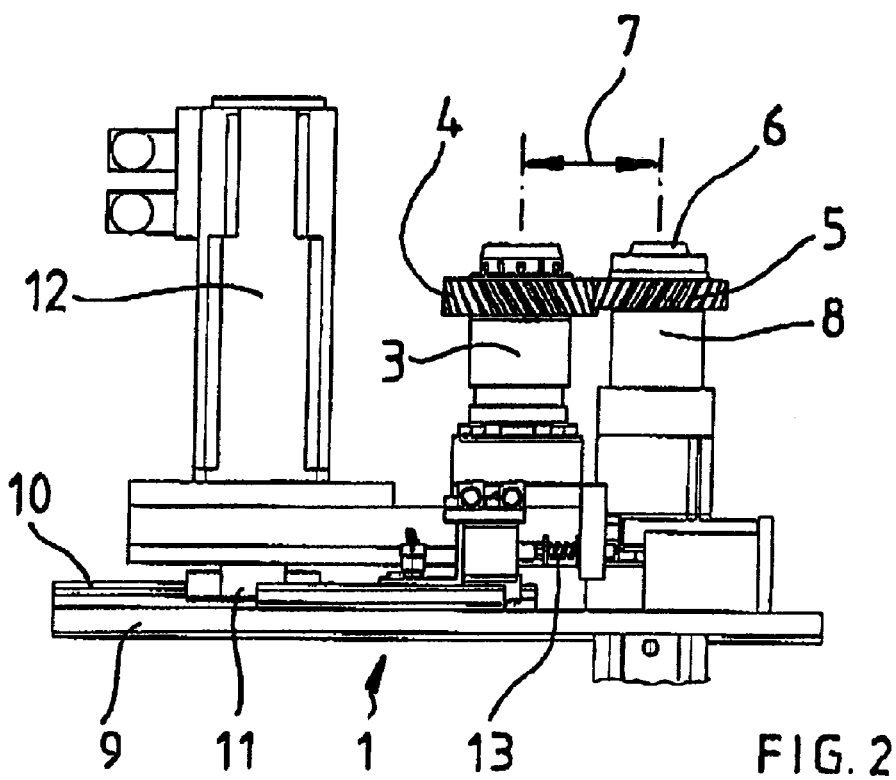
FIG. 2 is a diagrammatic, side view of the gearwheel machining tool from FIG. 1 having engaged a gearwheel to be machined.
Figure 3:
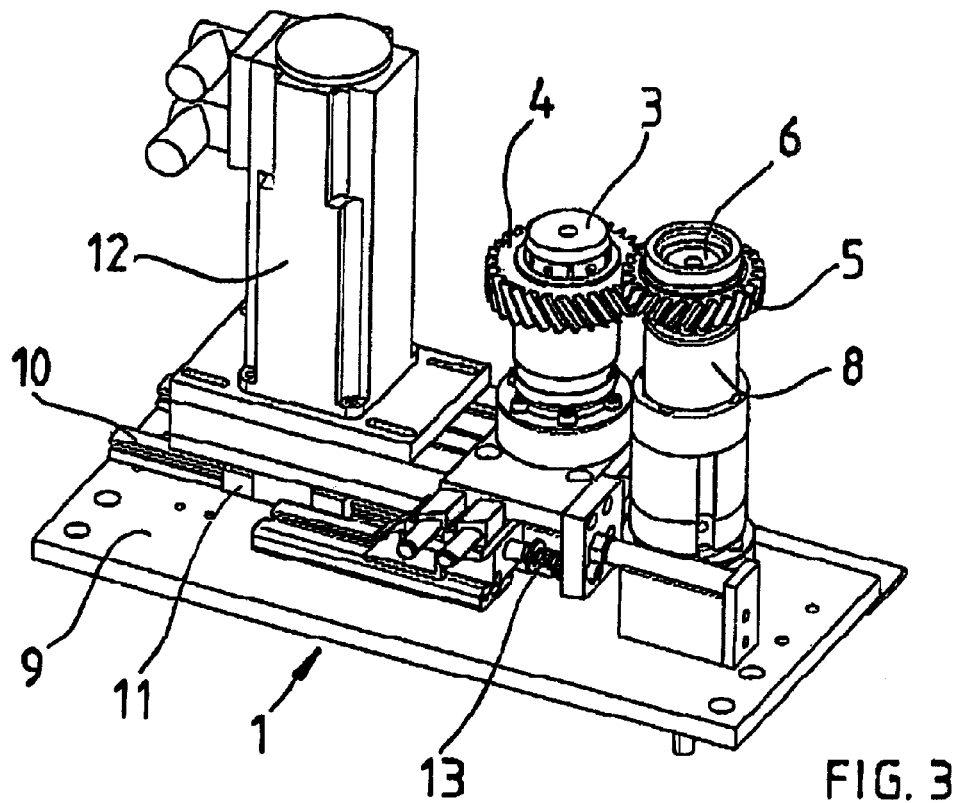
FIG. 3 is a diagrammatic, perspective view of the gearwheel machining tool from FIG. 1.
Figure 4:
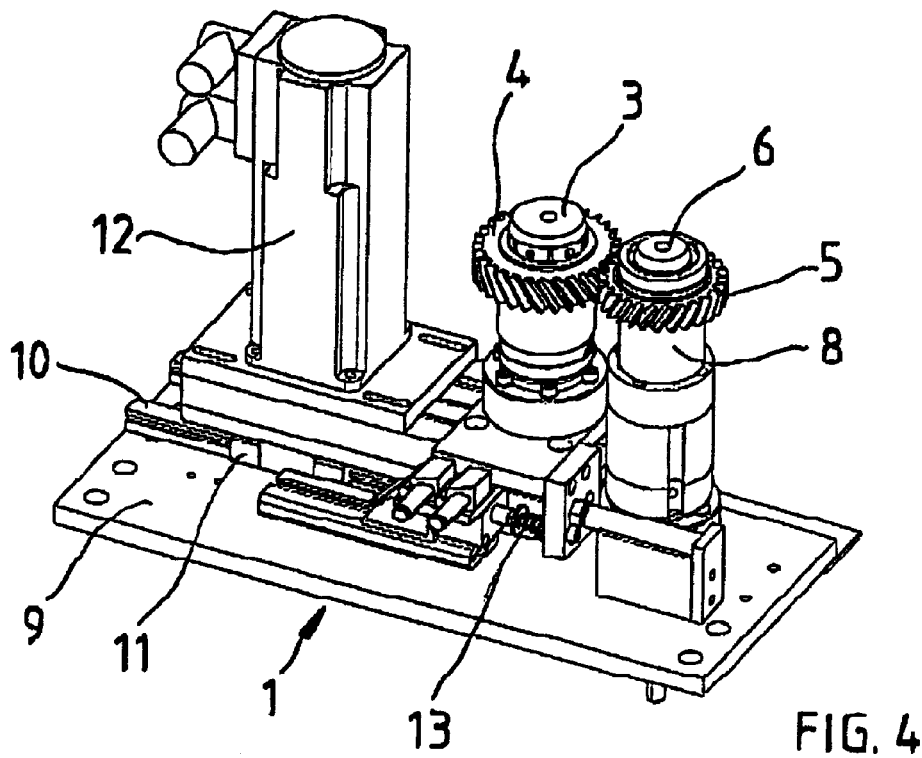
FIG. 4 is a diagrammatic, perspective view of the gearwheel machining tool from FIG. 2.

Referring now to the figures of the drawing in detail and first, particularly, to FIG. 1 thereof, there is shown a gearwheel machining tool 1 formed of a base plate 9, on which a guide 10 for a slide 11 is situated, on which an electric drive motor 12 and a drive axis 3 for a machining wheel 4 are situated so they are longitudinally displaceable, to be able to adapt an axial distance 7 to various gearwheel diameters.

Furthermore, an arbor 6 for receiving the gearwheel 5 to be machined is situated axially parallel to the drive axis 3 on the base plate 9, the drive axis 3 and the arbor 6 being implemented as chucking axes, which may axially clamp and center the wheels 4; 5. To engage the gearwheel 5 to be machined, it is simply placed by hand or automatically on the arbor 6 and subsequently the machining wheel 4, which is implemented as a diamond tool, is set into a slight rotation, by which the teeth of the wheels 4; 5 mutually engage, upon which the gearwheel 5 to be machined slips down the arbor 6 to its machining position due to its intrinsic weight and is centered and fixed there by an expansion of the expanding arbor 6.

The machining step for the gearwheel 5 to be machined subsequently begins, either via a single-flank contact at a fixed axial distance 7, during which a braking torque is applied by the arbor 6, or a double-flank machining at a variable axial distance 7, in which a predetermined contact pressure is generated via a spring 13 to achieve the desired smoothing action of the machining wheel 4 on the gearwheel 5 to be machined.

For disengagement, the arbor 6 of the gearwheel 5 to be machined is unclamped and the machining wheel 4 is accelerated backward, the gearwheel 5 to be machined being held by a support torque and sliding axially upward off of the arbor 6. The support torque may be generated manually by simple grasping with a simultaneous slight spiral movement upward or also by a gripper, which may perform an automated removal of the completely machined gearwheel 5.

The invention claimed is:

1. A method of operating a gearwheel machining tool having a machining wheel disposed on a drive axis, which comprises the steps of:
    placing a gearwheel to be machined at a fixed axial distance from the machining wheel, at least during engagement and/or disengagement of the gearwheel to be machined onto or from an arbor, the fixed axial distance being less than a sum of two tip circle radii and being greater than a sum of one tip circle radius of one of the machining wheel and the gearwheel and one root circle radius of the other of the machining wheel and the gearwheel; and
    placing the gearwheel to be machined at an arbitrary rotational angle position on the arbor, tooth areas of the gearwheel lateral external surface facing toward the machining wheel coming to rest on lateral tooth areas of the machining wheel, upon which the machining wheel being set into rotation or already rotates and the gearwheel to be machined slides axially on the arbor into a machining position, after which tooth gaps of two overlapping areas of the gearwheel and the machining wheel are rotated one over the other and the gearwheel and the machining wheel mutually come into engagement, upon which the gearwheel to be machined is fixed on the arbor and actual machining begins.

2. The method according to claim 1, which further comprises orienting the drive axis of the machining wheel and a driven axis of the arbor of the gearwheel to be machined in a vertical direction and the gearwheel to be machined assumes the machining position because of gravity.

3. The method according to claim 1, which further comprises orienting the drive axis of the machining wheel and a driven axis of the arbor of the gearwheel to be machined in horizontal directions and the gearwheel to be machined assumes the machining position supported by force.

4. The method according to claim 1, which further comprises placing the gearwheel to be machined on the arbor and/or removed therefrom one of manually and automatically.

5. The method according to claim 1, which further comprises:
    providing the arbor as an expanding arbor; and
    placing the gearwheel to be machined on the expanding arbor in a still unclamped state and the gearwheel being radially centered and fixed by the arbor by an enlargement of a circumference of the gearwheel only after reaching the machining position.

6. The method according to claim 1, wherein for disengaging a helical or spiral completely machined gearwheel, performing the steps of:
   unclamping the completely machined gearwheel from the arbor;
   retracting the machining wheel; and
   holding the completely machined gearwheel using a support torque and being moved axially away from the arbor by a rotation of the machining wheel.

7. The method according to claim 6, which further comprises applying the support torque one of manually and automatically.

8. The method according to claim 7, which further comprises applying the support torque via a gripper to the gearwheel.

9. The method according to claim 1, which further comprises selecting the gearwheel to be machined from the group consisting of external spur gears and spiral gears.

* * * * *